UNITED STATES PATENT OFFICE.

ALFRED A. WELLS, OF MONTCLAIR, NEW JERSEY, ASSIGNOR, BY MESNE ASSIGNMENTS, TO NATIONAL CARBON COMPANY, OF LONG ISLAND CITY, NEW YORK, A CORPORATION OF NEW JERSEY.

HIGHER-OXID-OF-MANGANESE DEPOLARIZER.

1,232,873.  Specification of Letters Patent.  Patented July 10, 1917.

No Drawing.  Application filed October 22, 1915.  Serial No. 57,384.

*To all whom it may concern:*

Be it known that I, ALFRED A. WELLS, a citizen of the United States, and a resident of Montclair, in the county of Essex and State of New Jersey, have invented certain new and useful Improvements in Higher-Oxid-of-Manganese Depolarizers, of which the following is a specification.

This invention relates to depolarizers adapted for use in cells of the Leclanché type especially dry batteries and relates particularly to depolarizers consisting of or containing higher oxids of manganese.

It is customary to use manganese dioxid as a depolarizing agent and its depolarizing activity is of course at best limited to the amount of available oxygen. It has been stated that depolarization stops as soon as the dioxid becomes reduced to the sesquioxid. According to the present invention oxids higher than the dioxid, such as heptaoxid ($Mn_2O_7$) or the trioxid ($MnO_3$), or various oxids intermediate these are used either alone or mixed with manganese dioxid. Between the oxids $Mn_2O_7$ and $MnO_3$ a number of oxids having more oxygen than is found in $MnO_3$ and less oxygen than is present in $Mn_2O_7$ may be utilized in depolarizing compositions in accordance with the present invention. The artificial form of manganese dioxid and especially the hydrated form is commonly used in batteries such as the miniature batteries employed in pocket search lights, owing to the greater activity of the depolarizing material and consequent yield of current, and I may use the intermediate higher oxids to which I have referred to advantage with such standard material.

According to the present method the higher oxids of manganese also may be employed in admixture with natural hydrate of manganese, such as psilomelane, to secure the advantage of high activity with comparative low cost of manufacture enabling a dense depolarizing material to be used in place of a bulky one.

A composition suitable for depolarizing purposes may be made by mixing six parts of finely ground pysolusite with one part of manganese trioxid or other suitable higher oxid, incorporating this with finely-divided graphite and compressing into a block of depolarizing material which may be used with a carbon and zinc electrode and ammonium chlorid exciting fluid in the ordinary way.

Some of the higher oxids of manganese are somewhat unstable giving up oxygen readily and furnishing oxygen in some cases for the other depolarizing material, if present. Manganese dioxid, reduced by the depolarizing reaction, to the sesquioxid may be converted to the dioxid by the supply of oxygen gradually furnished by the higher oxid of manganese present.

I do not wish to be restricted to the higher oxids specifically mentioned but include any such oxid having a higher oxygen content than manganese dioxid having the depolarizing properties indicated, especially as used in conjunction with natural manganese dioxid or artificial dioxid manganomanganites all in hydrated or dehydrated forms.

The higher oxids of manganese may be derived by condensing the vapors obtained by acting on potassium permanganate with sulfuric acid during the preparation of certain species of colloidal manganese dioxid or of very finely-divided manganese dioxid having certain characteristics of colloidal bodies, but not strictly speaking, a colloid itself.

If a mixture of potassium permanganate and concentrated sulfuric acid is poured unto dry sodium carbonate and the whole well cooled to about the freezing point, the vapors which are given off may be condensed in a second vessel provided the temperature is maintained at slightly below the freezing point. This product is largely composed of $MnO_3$, a reddish amorphous mass, which is fairly stable if maintained at relatively low temperatures.

If the sulfuric acid used to treat the potassium permanganate is of lower strength, for example, about eighty five per cent., an oily layer of $Mn_2O_7$ will separate. By using strengths of acid between eighty five per cent. and the concentrated acid, that is; about ninety four per cent., conditions become favorable for the formation of the intermediate oxids. Products of this character may be admixed with poorer grades of manganese dioxid when the higher oxids will slowly give up their excess oxygen to those compounds which are deficient in oxygen.

What I claim is:—

1. A depolarizer for Leclanché cells comprising carbon and an oxid of manganese higher than manganese dioxid.

2. A depolarizer for miniature dry batteries comprising carbon and an oxid of manganese higher than manganese dioxid associated with manganese dioxid.

3. A depolarizer for miniature dry batteries comprising carbon and an oxid of manganese higher than manganese dioxid associated with a form of artificial manganese dioxid.

4. A depolarizer for dry batteries of the Leclanché type which comprises an oxid of manganese having more oxygen than corresponds to the formula $MnO_3$ and less oxygen than that which corresponds to the formula $Mn_2O_7$.

ALFRED A. WELLS.